(12) United States Patent
Schneider

(10) Patent No.: US 8,464,252 B2
(45) Date of Patent: Jun. 11, 2013

(54) PER PROCESS VIRTUAL MACHINES

(75) Inventor: James P. Schneider, Raleigh, NC (US)

(73) Assignee: Red Hat, Inc., Raleigh, NC (US)

(\*) Notice: Subject to any disclaimer, the term of this patent is extended or adjusted under 35 U.S.C. 154(b) by 1141 days.

(21) Appl. No.: 12/395,335

(22) Filed: Feb. 27, 2009

(65) Prior Publication Data

US 2010/0223613 A1    Sep. 2, 2010

(51) Int. Cl.
G06F 9/455     (2006.01)

(52) U.S. Cl.
USPC ............................................. 718/1

(58) Field of Classification Search
USPC .................................. 718/1; 726/2
See application file for complete search history.

(56) References Cited

U.S. PATENT DOCUMENTS

| | | | | |
|---|---|---|---|---|
| 7,085,890 B2 * | 8/2006 | Kashyap | ................. | 711/130 |
| 7,689,733 B2 * | 3/2010 | Carpenter et al. | ............. | 710/22 |
| 7,865,893 B1 * | 1/2011 | Omelyanchuk et al. | .......... | 718/1 |
| 2007/0074208 A1 * | 3/2007 | Ling et al. | ................. | 718/1 |
| 2008/0034193 A1 * | 2/2008 | Day et al. | ................. | 712/244 |
| 2008/0263553 A1 * | 10/2008 | Lueck et al. | ................. | 718/102 |
| 2009/0112972 A1 * | 4/2009 | Liu | ................. | 709/203 |
| 2009/0199177 A1 * | 8/2009 | Edwards et al. | ................. | 718/1 |
| 2009/0222816 A1 * | 9/2009 | Mansell et al. | ................. | 718/1 |
| 2009/0241108 A1 * | 9/2009 | Edwards et al. | ................. | 718/1 |
| 2009/0265756 A1 * | 10/2009 | Zhang et al. | ................. | 726/1 |
| 2009/0300605 A1 * | 12/2009 | Edwards et al. | ................. | 718/1 |

OTHER PUBLICATIONS

US 8,370,838, 02/2013, Omelyanchuk et al. (withdrawn).*
Hunt, Galen, et al., "Sealing OS Processes to Improve Dependability and Safety," Proceedings of the 2nd ACM SIGOPS/EuroSys European Conference on Computer Systems 2007, 14 pages, Lisbon, Portugal.

\* cited by examiner

*Primary Examiner* — Aimee Li
(74) *Attorney, Agent, or Firm* — Lowenstein Sandler LLP

(57) ABSTRACT

A system and method for isolating processes executing within a computing device. A process is loaded into a virtual machine operating under the control of a hypervisor communicatively interfaced with an operating system kernel. A subset of an application programming interface (API) is exposed to the virtual machine enabling the process to interface with the operating system kernel via the subset of the API. The process is then executed in the virtual machine.

26 Claims, 6 Drawing Sheets

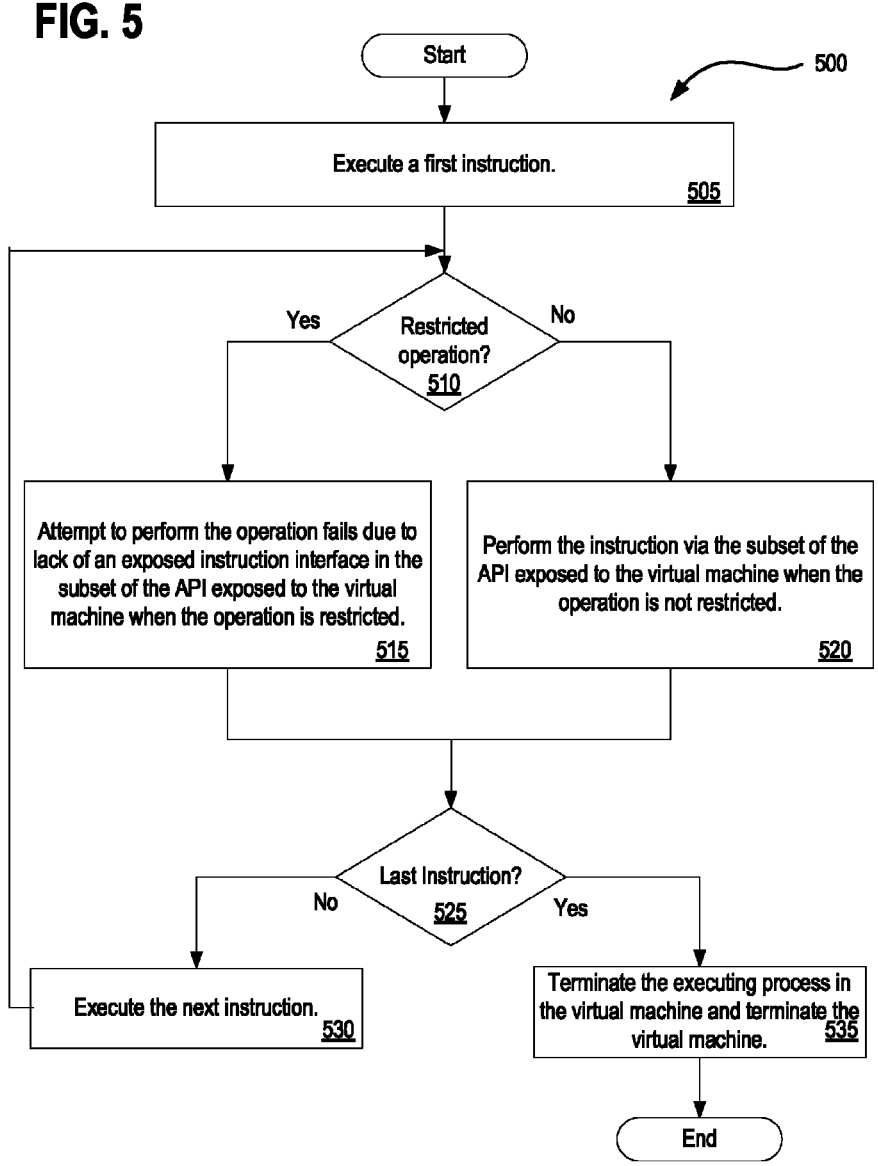

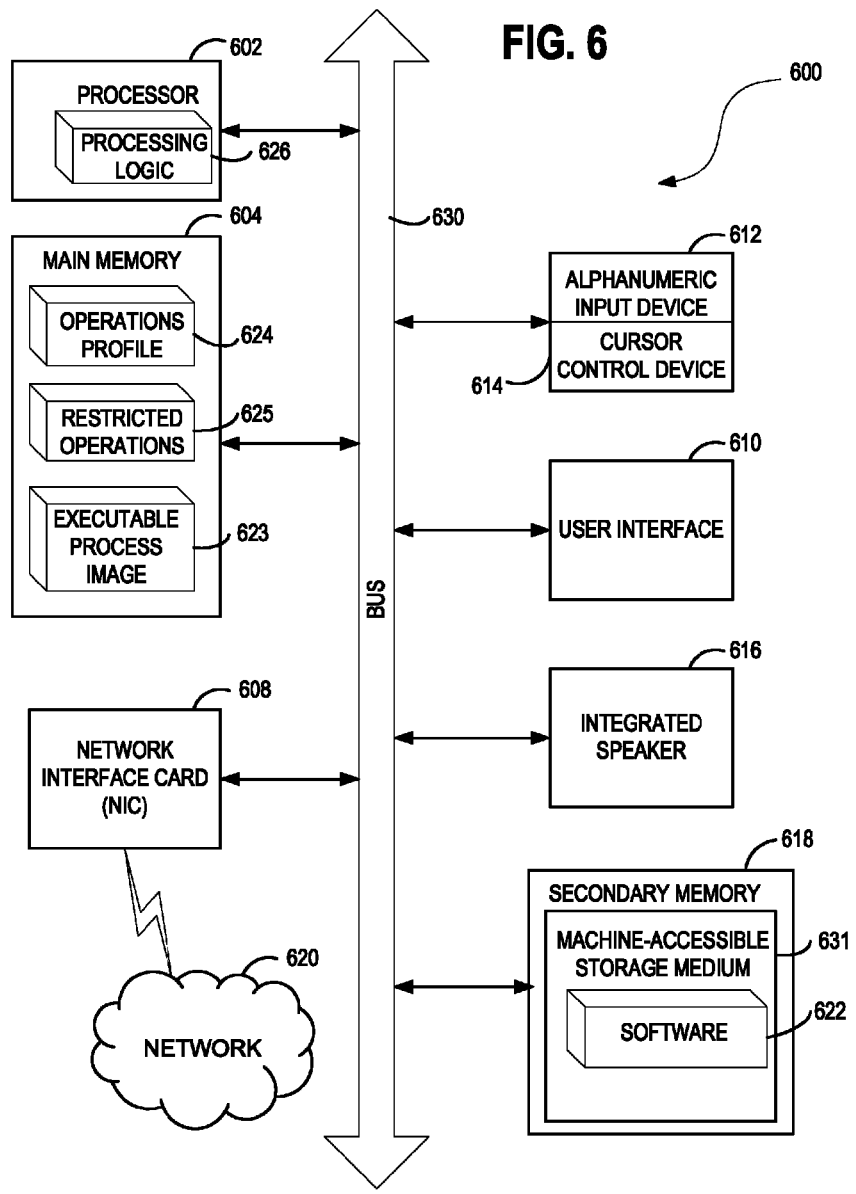

PER PROCESS VIRTUAL MACHINES

TECHNICAL FIELD

Embodiments of the invention relate to the field of computer processing, and more particularly, to isolating processes executing within a computer.

BACKGROUND

As computer processing technology became increasingly popular, the need for enhanced security of computing resources increased. The vast availability of computing platforms and technologies have created opportunities for computer hackers to surreptitiously gain access to the computing resources belonging to unsuspecting individuals and use those computing resources to carry out anything from mischievous pranks to crippling Denial of Service (DoS) attacks, to widespread financial fraud.

A longstanding protection used against such unauthorized access to a computing device or its corresponding resources is through the use of Network protections. Network protections such as Firewalls, proxy servers, and intelligent network gateways and routers protect computer resources on a network by, generally speaking, denying access to any computer which makes unsolicited requests for resources from a protected device, or attempts to execute commands or send information to the protected device without prior approval.

Unfortunately, network protections cannot protect against all mechanisms by which modern computer hackers attempt to gain unauthorized access to computing resources. For example, computer hackers may attempt to gain unauthorized access to a computing resource or to information within a computing device by tricking an unsuspecting victim into executing computer code locally that, for example, accesses protected memory areas belonging to unrelated processes, modifies a portion of another executable process image in memory, writes malicious or unauthorized code to an area of memory and then marks that writable area as executable, or causes programs and processes on the computing device to dynamically load executable code not originally intended for execution.

Such computer code when loaded, modified, or written into memory in such a way can be made to carry out any manner of malicious or unauthorized tasks, such as secretly authorizing remote network access to the computing device, sending sensitive data to a remote location, or opening a hidden gateway for a remote computing device to execute commands locally at the unsuspecting computer host.

Traditional mechanisms that exist for ensuring computer code is "trusted" or otherwise safe to execute on a local machine are, unfortunately, too time consuming and costly for generally available consumer applications. A hands-on extensive examination of the subject code is required to seek out any bugs or malicious code that could violate the intended security precautions, and only after such an examination is completed, is an executable image of the computer code certified as "trusted" for a particular application. While such a process is common place in mission critical Enterprise applications and very high security environments, this process is simply not feasible for a vast number of general utility computer applications.

Other mechanisms which have been proposed include modifying existing applications to self-certify that they do not, for example, modify memory portions allocated to other processes, attempt to modify the executing code of other processes, or attempt to cause other images, or themselves, to dynamically load malicious code segments for execution. Unfortunately, such a proposed mechanism is easily overcome by any computer programmer who either negligently or maliciously fails to adhere to the stated program requirements.

Another proposed mechanism includes rewriting a host operating system in conjunction with re-written executable applications which must adhere to certain requirements, such as not attempting to modify or access memory allocated to other processes, and then having those requirements checked and enforced by the operating system itself. While such a mechanism is more difficult to overcome, an extensive amount of effort must be invested in upgrading and updating so called, "legacy" applications, which are often unsupported, in order to make those applications execute within an operating system that enforces such programming requirements. Even computer applications which enjoy current support would require significant efforts to ensure the applications are compatible with the new requirements. Such a solution is thus impractical for many computer applications.

There are a great many applications which would therefore, be rendered obsolete, or incompatible with a new operating system having the more strict security requirements which prohibit certain types of memory access or modification of executing code.

BRIEF DESCRIPTION OF THE DRAWINGS

The present invention is illustrated by way of example, and not by way of limitation, and can be more fully understood with reference to the following detailed description when considered in connection with the figures in which:

FIG. 5 is a flow diagram illustrating a method 500 for executing a process within a virtual machine, in accordance with one embodiment of the present invention; and FIG. 6 illustrates a diagrammatic representation of a machine in the exemplary form of a computer system, in accordance with one embodiment of the present invention.

DETAILED DESCRIPTION

Figure 1:
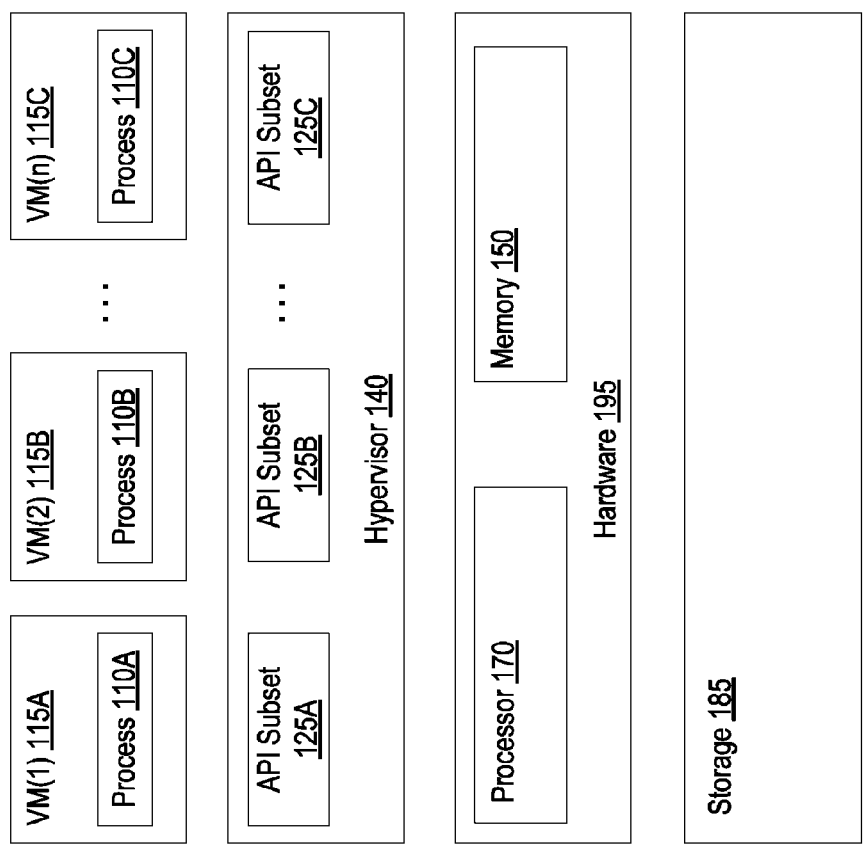
FIG. 1 illustrates an exemplary computer architecture in which embodiments of the present invention may operate.

Described herein are a system and method for isolating processes executing within a computing device. The computing device includes a hypervisor that is communicatively interfaced with an operating system kernel via an Application Programming Interface (API). In one embodiment, a process is loaded into a virtual machine operating under the control of the hypervisor, and a subset of the API is exposed to the virtual machine enabling the process to interface with the operating system kernel and execute the process in the virtual machine.

In one embodiment, multiple virtual machines are controlled and monitored by the hypervisor and are interfaced with an operating system kernel via the API. Each virtual machine may contain a single executing process which is exposed to a subset of the API through which the executing process may communicate with the operating system kernel and perform authorized, non-restricted functions. Restricted operations of the API are "hidden" from the executing process and cannot be accessed via the subset of the API exposed to the executing process in the virtual machine. In one embodiment, the hypervisor performs additional validity checking of operations requested though the subset of the API to ensure those operations are authorized to be performed by, or on behalf of, the requesting process.

In one embodiment, the virtual machine is further exposed to a copy-on-write memory image, such as an address space in memory that is addressable by the operating system kernel or an address space in memory allocated to the process. The virtual machine may be further exposed to a shared read-only view of the operating system kernel itself and to a read-only view of Dynamic Shared Objects (DSOs) associated with the operating system kernel.

The subset of the API exposed to each virtual machine may enhance security on the computing device by preventing the isolated process from executing certain suspect operations or restricted operations on the computing device which may result in security breaches or undesirable effects on the computing device. For example, restricted operations which are hidden from the virtual machine (e.g., not exposed to the virtual machine) may prevent certain operations initiated by the executing process from being performed, despite being attempted by an executing process which is isolated in accordance with the methods discussed herein. Such operations may include requests to access memory locations not associated with the isolated process or an operation that attempts to mark writable memory locations as executable, and so forth.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

FIG. 1 illustrates an exemplary computer architecture 100 in which embodiments of the present invention may operate. With reference to FIG. 1, the computer architecture 100 including processor 170 and memory 150 within hardware 195 in addition to storage 185. Hypervisor 140 which operates in conjunction with hardware 195 and storage 185 manages the multiple Virtual Machines (VMs) illustrated, including VM(1) 115A, VM(2) 115B, and up through VM(n) 115C. Each virtual machine 115 includes a process 110A, 110B, and 110C, loaded into the virtual machine 115 by the hypervisor.

Hypervisor 140, also referred to as a virtual machine monitor (VMM), provides virtualization of computer hardware associated with the computing architecture 100 and may allow multiple instances of virtual machines to operate on the host computing hardware, including enabling multiple operating systems to run on a computing device's hardware 195 concurrently. Hypervisor 140 may operate in "native" mode, sometimes referred to as a "type 1 hypervisor," in which the hypervisor interfaces directly with the hardware 195 of the computing architecture 100. Alternatively, hypervisor 140 may operate in "hosted" mode, in which the hypervisor 140 operates as a computer application process which executes within the control of another computing environment, such as a native host operating system which interfaces directly with the host computing hardware 195.

Hypervisor 140 includes an Application Programming Interface (API) which provides an interface into an operating system kernel. In one embodiment, hypervisor 140 exposes a portion of the API into the operating system kernel to the virtual machines 115 operating under the control of the hypervisor 140 as one or more API subsets 125. The hypervisor 140 may contain multiple types or classes of API subsets 125, each of which may contain a different or unique combination of interfaces which are available from the API. For example, the hypervisor 140 may contain a variety of API subsets 125 which may be exposed to, allocated to, or associated with a particular virtual machine 115 based on a particular process 110.

The API subset 125 exposed to a virtual machine 125 may be selected based on a particular user requesting the process 110, based on a class or type of software, application, or process 110 to be loaded, or based on any of a variety of attributes upon which different levels of security or different allotments of functionality may be appropriate (e.g., a process loaded by a "root" level account in Linux may be subject to fewer security restrictions than a user level account which requests execution of the same process 110).

The API provides a mechanism by which hypervisor 140 or virtual machines 115 under the control of hypervisor 140 may communicate with an operating system kernel available within the computing device. In one embodiment, the virtual machines 115 are isolated from the operating system kernel in such a way that they have no visibility or access to the functionality of the kernel except through an API subset 125 exposed to or associated with the virtual machine 115 and its executing process 110.

In one embodiment, hypervisor 140 enables the isolation of a process 110 within a computing environment through the use of a virtual machine 115 that executes a single process 110 in the virtual machine 115, also referred to as a "per process virtual machine." For example, the hypervisor 140 may receive a request to execute a process within the computer architecture 100. Responsive to the request, the hypervisor 140 may create a virtual machine 115 (e.g., by cloning an existing virtual machine as discussed in more detail below) to execute the requested process 110. The hypervisor 140 allocates address space in memory 150 to the virtual machine 115 and loads an image of the requested process 110 from storage 185 into the virtual machine 115, and in particular, into the memory 150 allocated to the virtual machine 115.

The hypervisor 140 may expose an API subset 125 or portion of an application programming interface between the hypervisor 140 and an operating system kernel to the virtual machine, through which the process 110 may initiate operations or functionality that reside within the kernel. In some embodiments, the hypervisor 140 may further expose all or a part of an operating system kernel to the virtual machine 115 by allocating the address space in which the kernel resides to the virtual machine as read-only memory. The hypervisor 140 then initiates execution of the process image previously loaded into the virtual machine as an executing process 110. The executing process has access to hardware 195 resources within the computer architecture 110 to the extent that the hypervisor 140 has exposed such resources to the virtual machine 115 (such as exposure to read-only memory address space in which all or a portion of the kernel resides and the API subset 125 which exposes a portion of the interface between the hypervisor and the kernel).

Figure 2:
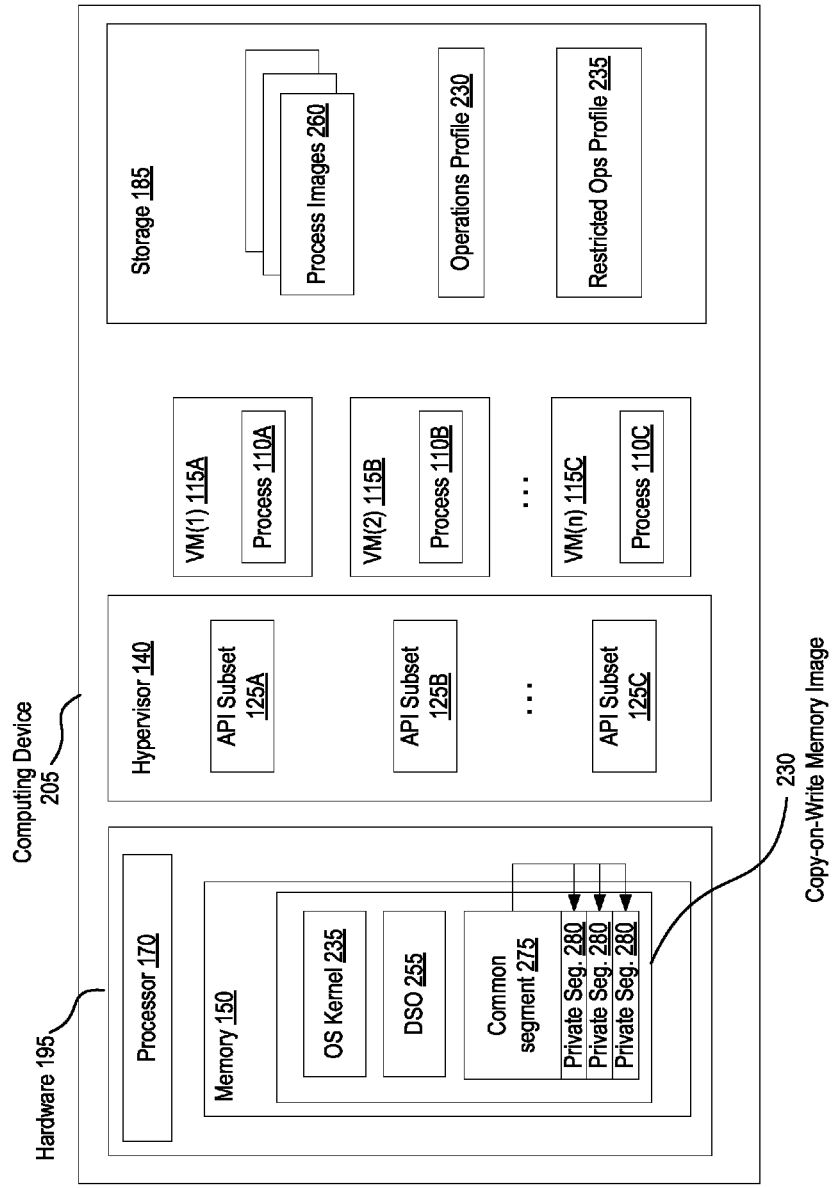
FIG. 2 illustrates an exemplary computing device in accordance with some embodiments of the present invention.

FIG. 2 illustrates an exemplary computing device 205 in accordance with some embodiments of the present invention. In one embodiment, hypervisor 140 exposes a copy-on-write memory image 230 of an address space in memory to the virtual machine 115. For example, the hypervisor 140 may expose the address space allocated to the operating system kernel 235 within the memory 150, an address space allocated to the process 110 in the memory 150, or both. In one embodiment, exposing the copy-on-write memory image 230 to each of the virtual machines 115 may enable more efficient use of hardware resources on the computing device 205 by enabling each virtual machine 115 to operate utilizing the memory contents that have not been written to or updated by a particular virtual machine 115 in a shared fashion among all the virtual machines 115 under the control of the hypervisor 140. Conversely, memory contents that have been written to (e.g., modified) to by a particular virtual machine 115 may be uniquely addressed in a private fashion, accessible to the virtual machine 115 that performed the write, without affecting other virtual machines 115 operating under the control of the hypervisor 140. Other virtual machines 115 continue to reference the unmodified portion of memory in a shared fashion until and unless they similarly perform a write.

In one embodiment, the hypervisor 140 intercepts a request from an executing process 110 to write to the copy-on-write memory image 230. The hypervisor 140 allocates a portion of a shared common segment 275 of the copy-on-write memory image 230 to a private segment 280 of the copy-on-write memory image 230 to the requesting process 110 executing in the virtual machine 115. The requested update or modification is then written to the private copy portion 280 of the copy-on-write memory image 230 based on the request from the process 110. Other virtual machines 115 operating under control of the hypervisor 140 that have not performed a write to the shared common segment 275 will continue to reference the memory in the shared common segment 275.

The operating system kernel 235 may be exposed to the virtual machines 115 through the use of copy-on-write memory or read-only memory, depending upon the particular security restrictions and extent of process isolation imposed upon a virtual machine 115 and its executing process 110. In one embodiment, portions or subsets of the operating system kernel 235 may be selectively exposed to a virtual machine 115, rather than exposing the entire operating system kernel 235 image in the memory 150. For example, through the selective mapping of the various modular kernel components which constitute most modern operating system kernels 235, the hypervisor 140 can selectively expose the particular modular kernel components that are required or authorized for a particular process 110 to the virtual machine 115 in which that process 110 is executing. Modular kernel components which are not required or not authorized, are kept from the view of the virtual machine 115 as such components are not exposed.

For example, a process 110 which provides functionality for performing mathematical calculations may have no need to access network resources available through the operating system kernel 235. Accordingly, the hypervisor 140 may selectively expose only the required functionality to the virtual machine 115 executing the process 110, and hide, or simply not expose the modular components of the operating system kernel 235 residing in memory that provide access to network resources. Selectively exposing only the required portions of the operating system kernel 235 in the memory 235 to the various virtual machines 115 may provide further enhanced process isolation and system security above and beyond exposing only a portion or subset of an API for the operating system kernel to the virtual machine.

When virtual machines 115 are allowed to write to, update, or modify information to memory allocated to the operating system kernel 235, the hypervisor may expose the operating system kernel 235 to the virtual machines via the copy-on-write memory image. Conversely, when the virtual machines 115 are not allowed to write to, update, or modify information stored within memory allocated to the operating system kernel 235 (e.g., due to more restrictive security requirements or enhanced levels of process isolation within the computing device), the hypervisor 140 may instead expose the operating system kernel 235 to the virtual machines 115 via read-only memory, or mark the appropriate portion of the copy-on-write memory as read-only, thus preventing any process 110 executing within the virtual machines from modifying the memory space allocated to the operating system kernel 235 in any way.

Hypervisor 140 may expose Dynamic Shared Objects 255 associated with the operating system kernel 235 to the virtual machines 115 via the copy-on-write memory image 230 or via read-only memory depending on, among other things, process isolation and security requirements within the computing device 205. In one embodiment, a process 110 executing within a particular virtual machine 115 references portions of memory 150 that are exposed to it via the hypervisor 140, such as the operating system kernel 235, the DSOs 255, or a copy-on-write memory image 230.

In one embodiment, each virtual machine 115 has its own "view" of the operating system kernel 235 and Dynamic Shared Objects 255. In one embodiment, the view is identical among the various virtual machines 115 operating under the control of the hypervisor 140, but each virtual machine 115 operates independently from all other virtual machines 115 and each virtual machine is unaware of the existence of the other virtual machines 115. In one embodiment, the hypervisor 140 monitors and tracks all the virtual machines 115 operating on the computing device 205 and the hypervisor provides an interface to the operating system kernel 235 through which various executing processes 110 having the requisite authority granted by the hypervisor 140 may manage, manipulate, and otherwise affect other isolated processes 110 executing on the computing device 205, within the various virtual machines 115. Stated differently, in one embodiment, it is only through the hypervisor 140 that any process 110 executing within a virtual machine 115 under the control of the hypervisor may affect the operation of another process 110 executing within a virtual machine 115 under the control of the hypervisor. In one embodiment, the computing device 205 loads a second process 110 requested for execution into a second virtual machine 115 operating under the control of the hypervisor 140 and exposes the kernel 235 to the first process and to the second process via the hypervisor 140. Any number of virtual machines, each having an isolated process 110 executing therein, may be present within a computing device, so long as that number is within the operational limitations of the host computing hardware 195.

Generally speaking, each application (e.g., a web browser, a word processor, an antivirus application, a print daemon, etc.), executes as a single "process" 110 within a single virtual machine 115 under the control of the hypervisor 140. Sub-units of execution associated with those processes, often referred to as "threads," or "process threads," are managed and maintained by either the operating system kernel or the executing process 110 in which the threads are present. Thus, a process 110, such as a web browser, having multiple tabs or multiple windows open may still operate as a single process 110 within a single virtual machine 115, despite having multiple process threads, or individual units of parallel execution.

In one embodiment, a first process 110 of a first virtual machine 115 is hidden from a second process 110 of a second virtual machine 115 via the hypervisor 140. In such an embodiment, the second process 110 of the second virtual machine 115 is likewise hidden from the first process 110 of the first virtual machine 115 via the hypervisor 140. In one embodiment, the hypervisor 140 may provide a mechanism through which isolated processes 110 can reference other isolated processes via an API subset 125 exposed to the process 110 by the hypervisor 140. However, API calls capable of providing inter-process interactions may similarly be designated as restricted operations, and thus, unavailable to the isolated processes, depending on the security requirements of the computing environment.

Each virtual machine 115 under the control of the hypervisor 140 may function as a logical extreme of a conventional "virtual machine," insomuch that execution within each virtual machine 115 is abstracted to the extent where only a single isolated process 110 executes within each virtual machine 115, rather than, for example, a conventional operating system executing within a virtual machine which may have multiple processes, all executing within the same virtual machine. In such a multi-process virtual machine environment, the processes may be fully exposed to each other and capable of causing harmful interactions among the various processes or negatively affecting the operation or resources allocated to other processes (e.g., such as writing to memory space allocated to another process). Abstracting the virtual machines as described herein may provide enhanced process isolation, improved process control, and improved process security within the computing device 205 when compared to conventional mechanisms.

Each single isolated process 110 executing within a single virtual machine 115, may be a computer application, a process, daemon, service, or other executable computer utility that is requested for execution. Prior to execution, the process 110 may reside within storage 185 (e.g., a hard disk drive or other similar storage) as a process image 260.

In one embodiment, the virtual machine 115 executes as a guest operating system under the control of the hypervisor 140. For example, the hypervisor 140 may interact with the virtual machine 115 as a guest operating system notwithstanding the virtual machine 115 having only a single isolated process 110 executing therein.

In one embodiment, the hypervisor 140 exposes non-restricted operations to the virtual machine 115 and hides (or does not expose) restricted operations from the virtual machine 115. Restricted operations may also be referred to as "suspect operations" or "prohibited operations."

Generally speaking, restricted operations include functionality available within the operating system kernel 235 or accessible via an API into the operating system kernel that can potentially be used to exploit security vulnerabilities within a computing device 205. However, any operation may be designated as a restricted operation based upon the security and isolation requirements for a particular computing device 205 implementation.

For example, suspect operations or restricted operations may include requests to load executable code after an initial process load associated with the computer application, requests to access memory locations which are not allocated to the computer application, requests to make executable memory locations writable, requests to make writable memory locations executable, requests to commit modifications to dynamically shared objects or dynamically linked library modules, and requests to self-modify the executing process 110 (e.g., any attempt to modify the process's 110 own computer code executing from within a virtual machine 115).

In one embodiment, the hypervisor 140 marks an executable process image 260 associated with the process as read-only in the copy-on-write memory image 230 and disables calls in the API to mark all or a portion of the executable process image 260 associated with the process as writable in the copy-on-write memory image 230.

The above list of restricted, suspect, or prohibited operations are merely an example of some operations which may expose the computing device 205, its executing processes 110, the operating system kernel 235, and computer resources in general to potentially malicious code or even negligently written code that inappropriately interferes with other processes 110 executing within the same computing environment. For example, the prohibition against marking writable memory locations as executable, may be used to prevent a computer application from writing malicious code into memory, and then causing that code to be executed, either by the executing process 110 itself, or by other processes 110 within the computing device 205.

The API subset 125 exposed to a particular virtual machine 115 is based upon the needs of the executing process, software, or application in question. For example, a restricted operation may be required for some executing processes but not others. Alternatively, certain restricted operations may be specified as prohibited by default, and allowed only based on express authorization via the hypervisor 140. Similarly, operations may be specified as prohibited and never authorized based on the operational requirements of a particular computing environment.

Restricted operations that are prohibited by default, but authorized for a particular process may be exposed to the process via the subset of the API, and thus, the process will have the ability to initiate and successfully perform those restricted operations. In other embodiments, the restricted operations are denied by default for all processes, for example, to ensure a minimum level of process isolation and general security for the computing device 205.

Different base profiles may be utilized to control what operations are delegated as restricted operations and non-restricted operations respectively. For example, certain applications, such as applications developed internal to an Enterprise or applications from a known reliable source, may be certified with a higher level of trust, and thus, it may be appropriate to grant those trusted applications greater levels of flexibility. For example, by designating fewer operations as restricted operations. Conversely, some applications may be inherently suspect, such as executable process images 260 received via email or applications downloaded from the Internet or from third parties not designated as trusted or as known reliable sources.

The operations exposed by the hypervisor 140 to a virtual machine 115 within an API subset 125 may be based on an operations profile 230. For example, the operations profile 230 may list non-restricted operations that are to be exposed by default, list non-restricted operations that are to be exposed for a particular process or a particular process image 260. Each process or process image 260 may have a unique list of non-restricted operations to be exposed as a subset of the API which is different than a list of non-restricted operations to be exposed for other process images 260.

In one embodiment, the subset of the API exposed to a virtual machine 115 is based further on a restricted operations profile 235. Similar to the operations profile 230, the restricted operations profile 235 may list operations which are prohibited by default, operations which are always prohibited, operations which are prohibited for certain classes of processes or executable process images 260, or operations which are prohibited for a particular process or process image 260.

The operations profile 230 or the restricted operations profile 235, or both, may be generated based on an execution of a particular process in "recording" mode or "learning" mode. In one embodiment executing the process in recording mode automatically generates an operations profile. For example, the hypervisor may execute the process in a virtual machine, record all requests made to a fully exposed API from the executing process, and store the recorded requests in the operations profile for later reference. In one embodiment, a restricted operations profile is derived from the automatically generated operations profile and based further on a list of operations which are prohibited by default or designated as suspect operations.

In one embodiment, only operations requested by the process during recording or learning modes are authorized and made into non-restricted operations, so as to ensure that a later modification to the executing process or an executable process image 260 is not permitted to initiate requests that are not certified as being required by the base application (e.g., required by the base application as tested and executed in learning mode).

Virtual machines may be generated or created by the hypervisor 140 through a "cloning" or copying process. In one embodiment, a virtual machine 115 is generated at boot time of the computing hardware 195, from which other virtual machines 115 may be copied or cloned. For example, in UNIX operating system variants (e.g., Linux), the initial process required to begin booting an operating system kernel, such as process "1," may be placed into a virtual machine for execution. The hypervisor 140 may then expose the appropriate API subset 125 to the virtual machine, expose the operating system kernel 235 in memory 150 to the virtual machine, and then initiate execution of the process. In one embodiment, subsequent processes 110 requested for execution are placed into virtual machines 115 which are cloned from an existing virtual machine 115 under the control of the hypervisor.

For example, the hypervisor 140, upon receiving a request to execute a process may initiate a multi-step process to create a complete copy or a clone of an existing virtual machine. Such a process may include: Requesting a process "fork," or similar function to make an identical duplicate of the executing process in the new clone as is executing in the virtual machine being cloned. Loading a process image (such as process image 260) into the virtual machine from storage, thus replacing a process image previously associated with the virtual machine (e.g., the process image 260 being used by the original virtual machine from which the clone was made). Allocating an API subset 125 to the clone, thus replacing any prior API subset allocated. Allocating or exposing all or a portion of the operating system kernel 235 to the clone, thus replacing a prior allocation which was carried over in the cloning process. Allocating or exposing an address space, such as copy-on-write memory image 230 to the clone, thus replacing any prior allocation copied from originating virtual machine. And initiating execution of the newly loaded process image 260 within the newly created virtual machine 115, thus replacing the forked or copied process carried over from the original virtual machine. Obviously, additional steps or fewer steps may be performed, and many of the steps may be performed in a variety of sequences, as the above is merely one example of how virtual machines 115 may be created or instantiated to support the execution of a requested process.

In one embodiment, virtual machines 115 are automatically destroyed, cleaned up, or eliminated by the hypervisor 140 once a process assigned to and executing within a particular virtual machine 115 terminates.

Figure 3:
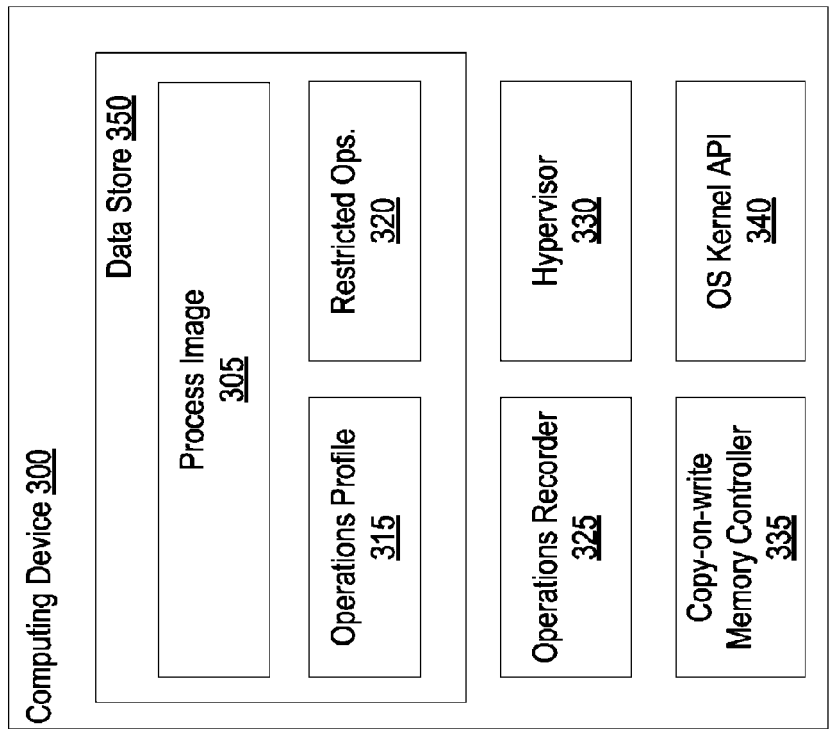
FIG. 3 is a diagrammatic representation of a computing device in accordance with one embodiment of the present invention.

FIG. 3 is a diagrammatic representation of a computing device 300 in accordance with one embodiment of the present invention. Computing device 300 includes a data store 350 which may store an executable process image 305 which may be loaded into a virtual machine as an executing process, operations profile 315 which specifies which operations are satisfactory for exposure to a virtual machine in a subset of the API, and restricted operations 320 which specifies those operations which should be prohibited or otherwise hidden from the virtual machine and not exposed via the subset of the API, and thus, will not be accessible to an executing process operating within a virtual machine.

Computing device 300 further includes operations recorder 325 which learns or records all operations initiated by a process executing in recording mode, and then stores those operations in an operations profile for later reference. Computing device 300 includes hypervisor 330 which creates virtual machines, exposes the subset of the API to those virtual machines, loads individual processes into individual virtual machines, and controls/monitors the virtual machines. Copy-on-write memory controller 335 of computing device 300 manages the copy-on-write memory operations, such as maintaining those memory portions which are common across multiple virtual machines and those portions of memory which have been modified and are allocated as private or unique memory portions for a particular virtual machine and are not shared with or common to others. Operating system kernel API 340 of computing device 300 provides a communication interface between hypervisor 330 and an operating system kernel within the computing device 300, from which API subsets may be derived.

Figure 4:
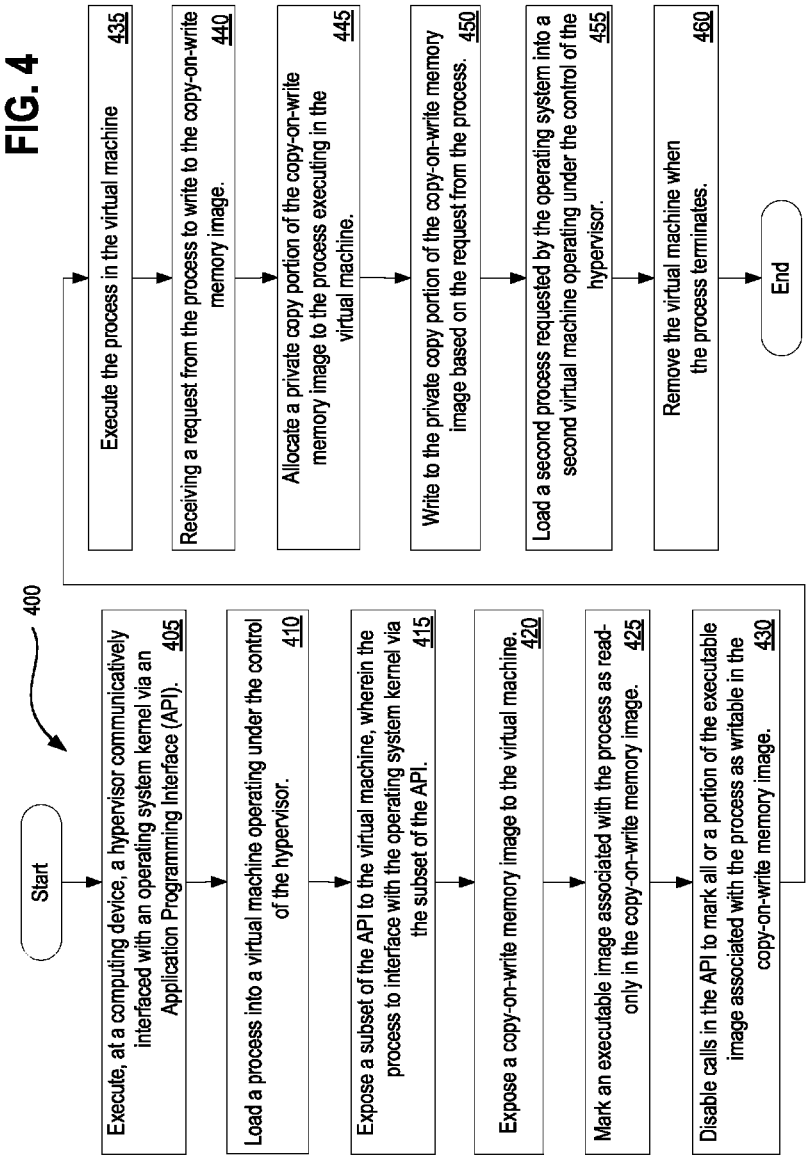
FIG. 4 is a flow diagram illustrating a method for isolating a process within a virtual machine, in accordance with one embodiment of the present invention.

FIG. 4 is a flow diagram illustrating a method 400 for isolating a process within a virtual machine, in accordance with one embodiment of the present invention. Method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, method 400 is performed by a computing device, such as computing device 205 of FIG. 1.

Referring to FIG. 4, method 400 begins with processing logic in the computing device executing a hypervisor communicatively interfaced with an operating system kernel (block 405) via an Application Programming Interface (API). At block 410, processing logic loads a process requested for execution into a virtual machine that operates under the control of the hypervisor.

At block 415, processing logic exposes a subset of the API to the virtual machine, which allows the process requested for execution to execute with the operating system kernel through the subset of the API. At block 420, processing logic exposes a copy-on-write memory image to the virtual machine. At block 425, processing logic marks an executable image associated with the process as read-only in the copy-on-write memory image. At block 430, processing logic disables calls in the API to mark all or a portion of the executable image associated with the process as writable in the copy-on-write memory image.

At block 435, processing logic executes the loaded process in the virtual machine. At block 440, processing logic receives a request from the executing process to write to the copy-on-write memory image. At block 445, processing logic allocates a private copy portion of the copy-on-write memory image to the process executing in the virtual machine. At block 450, processing logic writes to the private copy portion of the copy-on-write memory image based on the request from the executing process.

At block 455, processing logic loads a second process requested for execution into a second virtual machine operating under the control of the hypervisor. At block 460, processing logic removes the virtual machine when the executing process terminates.

FIG. 5 is a flow diagram illustrating a method 500 for executing a process within a virtual machine, in accordance with one embodiment of the present invention. Method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, method 500 is performed by a computing device, such as computing device 205 of FIG. 1.

Referring to FIG. 5, method 500 begins with processing logic in the computing device to execute a first instruction (block 505). At decision block 510, if the instruction is a restricted operation, then method 500 continues to block 515, where processing logic in the computing device fails to perform the restricted operation due to lack of an exposed instruction interface in the subset of the API exposed to the virtual machine. Alternatively, at decision block 510, when the instruction is a non-restricted operation, the method 500 continues to block 520, where processing logic in the computing device performs the instruction via the subset of the API exposed to the virtual machine.

Method 500 proceeds from blocks 515 and 520 to decision block 525, where a determination is made whether the instruction executed is the last instruction of the executing process in the virtual machine. When the instruction is the last instruction, method 500 proceeds to block 535 where processing logic in the computing device terminates the executing process in the virtual machine and terminates or removes the virtual machine in which the process was execution. After block 535 method 500 ends. When the instruction is not the last instruction, method 500 proceeds to block 530, where processing logic executes the next instruction and the method 500 is repeated.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine (e.g., computing device) may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 618 (e.g., a data storage device), which communicate with each other via a bus 630. Main memory 604 includes operations profile 624 which contains a list of operations to be exposed to a virtual machine in a subset of an API to an operating system kernel. The list of restricted operations 625, which is also stored within the main memory 604 may be referenced by a hypervisor in determining which operations will be hidden, restricted, or left un-exposed to a virtual machine in a subset of an API. Executable process image 623 is similarly stored within main memory 604, which may be an unmodified and unsupported legacy application, a currently supported and trusted Enterprise utility application, or an inherently suspect and untrusted computer application to be executed in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
loading, at a computing device, a process into a virtual machine operating under control of a hypervisor communicatively interfaced with a host operating system kernel of a host operating system of the computing device, the hypervisor executing under control of the host operating system;
exposing, at the computing device, a subset of an Application Programming Interface (API) to the virtual machine, wherein the process interfaces with the host operating system kernel via the subset of the API; and
executing the process in the virtual machine.

2. The computer-implemented method of claim 1, further comprising:
exposing, at the computing device, a copy-on-write memory image associated with the operating system kernel to the virtual machine.

3. The computer-implemented method of claim 2, further comprising:
exposing, at the computing device, a read-only memory image of the operating system kernel to the virtual machine.

4. The computer-implemented method of claim 1, further comprising:
receiving, at the hypervisor, a request from the process to write to a copy-on-write memory image;
allocating a private copy portion of the copy-on-write memory image to the process executing in the virtual machine; and
writing to the private copy portion of the copy-on-write memory image based on the request from the process.

5. The computer-implemented method of claim 1, wherein the hypervisor controls a plurality of virtual machines, each of which comprises a read-only view of the operating system kernel in memory, and wherein:
each virtual machine contains a single executing process;
the hypervisor exposes a subset of the API to each virtual machine; and wherein
the hypervisor exposes a copy-on-write memory image associated with the operating system kernel to each virtual machine.

6. The computer-implemented method of claim 1, wherein the process executes as a guest operating system under control of the hypervisor.

7. The computer-implemented method of claim 1, wherein exposing the subset of the API to the virtual machine comprises:
exposing non-restricted operations of the operating system kernel accessible via the API to the virtual machine; and
hiding restricted operations accessible to the operating system kernel accessible via the API from the virtual machine.

8. The computer-implemented method of claim 1, wherein:
the API comprises interfaces to restricted operations of the operating system kernel and interfaces to non-restricted operations of the operating system kernel;
the subset of the API exposed to the virtual machine comprises the interfaces to the non-restricted operations; and wherein
the interfaces to the restricted operations are not exposed to the virtual machine.

9. The computer-implemented method of claim 8, wherein the restricted operations are selected from a group comprising:
requests to load executable code after an initial process load associated with a computer application;
requests to access memory locations which are not allocated to the computer application;
requests to make executable memory locations writable;
requests to make writable memory locations executable;
requests to commit modifications to dynamic shared objects; and
requests to self-modify the computer application.

10. The computer-implemented method of claim 1, further comprising:
marking an executable image associated with the process as read-only in the copy-on-write memory image; and
disabling interfaces in the subset of the API to mark all or a portion of the executable image associated with the process as writable in the copy-on-write memory image.

11. The computer-implemented method of claim 1, further comprising:
loading a second process into a second virtual machine operating under control of the hypervisor;
exposing a copy-on-write memory image associated with the operating system kernel to the virtual machine; and
exposing a read-only memory image of the operating system kernel to the virtual machine.

12. The computer-implemented method of claim 11, wherein a first process of a first virtual machine is hidden from a second process of a second virtual machine via the hypervisor, and wherein the second process of the second virtual machine is hidden from the first process of the first virtual machine via the hypervisor.

13. The computer-implemented method of claim 1, further comprising:
removing the virtual machine when the process terminates; and
removing the virtual machine from a plurality of virtual machines operating under control of the hypervisor.

14. The computer-implemented method of claim 1, wherein executing the process in the virtual machine comprises executing the process in recording mode to generate an operations profile.

15. The computer-implemented method of claim 14, wherein executing the process in recording mode comprises:
executing the process in the virtual machine;
recording all requests made to the API from the executing process; and
storing the recorded requests in the operations profile.

16. The computer-implemented method of claim 15, wherein the subset of the API exposed to the virtual machine is based on the operations profile.

17. The computer-implemented method of claim 16, wherein the subset of the API exposed to the virtual machine is based further on a restricted operations profile.

18. A non-transitory computer-readable medium, having instructions stored thereon that, when executed by a processor, perform a method comprising:
loading a process into a virtual machine operating under control of a hypervisor communicatively interfaced with a host operating system kernel of a host operating system of the computing device, the hypervisor executing under control of the host operating system;
exposing a subset of an Application Programming Interface (API) to the virtual machine, wherein the process interfaces with the host operating system kernel via the subset of the API; and
executing the process in the virtual machine.

19. The computer-readable medium of claim 18, wherein the method to be performed further comprises:
exposing a copy-on-write memory image associated with the operating system kernel to the virtual machine.

20. The computer-readable medium of claim 19, wherein the method to be performed further comprises:
exposing at least a portion of a read-only memory image of the operating system kernel to the virtual machine, wherein the portion of the read-only memory image comprises one or more modular components of the operating system in the read-only memory image.

21. A computing device comprising:
a memory; and
a processor, coupled to the memory, to execute a hypervisor under control of a host operating system, the hypervisor communicatively interfaced with a host operating system kernel of the host operating system via an Application Programming Interface (API), the hypervisor to load a process into a virtual machine operating under control of the hypervisor, and to expose a subset of the API to the virtual machine, wherein the process interfaces with the host operating system kernel via the subset of the API, and wherein the processor is to execute the process in the virtual machine.

22. The computing device of claim 21, further comprising:
an operations recorder, coupled with the memory and the processor, to record all API requests initiated by the executing process, regardless of whether the API requests are supported by the subset of the API exposed to the virtual machine; and wherein
the operations recorder is operable to further store the recorded API requests in an operations profile.

23. The computing device of claim 21, further comprising:
a copy-on-write memory controller, coupled with the memory, to manage a copy-on-write memory image stored in the memory and associated with the operating system kernel, and wherein
the copy-on-write memory controller is operable to further:
expose the read-only memory image of the operating system kernel to the virtual machine via the hypervisor,
receiving from the hypervisor, a request to write to the copy-on-write memory image on behalf of the process,
allocate a private copy portion of the copy-on-write memory image to the process executing in the virtual machine, and
write to the private copy portion of the copy-on-write memory image based on the request from the hypervisor.

24. A computer-implemented method comprising:
loading, at a computing device, a process within a virtual machine under control of a hypervisor, the hypervisor being communicatively interfaced with a host operating system kernel of a host operating system via an Application Programming Interface (API), the hypervisor executing under control of the host operating system;
exposing a subset of the API to the virtual machine, wherein the subset of the API comprises a plurality of non-restricted operations of the host operating system kernel to the process loaded within the virtual machine; and
initiating execution of the process in the virtual machine.

25. The computer-implemented method of claim 24, further comprising:
receiving a request from the process executing in the virtual machine to perform an operation; and
transacting the operation requested by the process to the operating system kernel when the operation is exposed to the virtual machine via the subset of the API.

26. The computer-implemented method of claim 24, wherein a portion of the API unexposed to the virtual machine via the subset of the API comprises one or more restricted operations selected from a group comprising:
requests to load executable code after an initial process load associated with a computer application;
requests to access memory locations which are not allocated to the computer application;
requests to make executable memory locations writable;
requests to make writable memory locations executable;
requests to commit modifications to dynamic shared objects; and
requests to self-modify the computer application.

* * * * *